(12) United States Patent
Iio et al.

(10) Patent No.: US 6,670,061 B2
(45) Date of Patent: Dec. 30, 2003

(54) FUEL CELL POWER PLANT (75) Inventors: Masatoshi Iio, Yokohama (JP); Yasukazu Iwasaki, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 119 days.

(21) Appl. No.: 09/986,340

(22) Filed: Nov. 8, 2001

(65) Prior Publication Data
US 2002/0068204 A1 Jun. 6, 2002

(30) Foreign Application Priority Data
Dec. 4, 2000 (JP) ........................ 2000-368485

(51) Int. Cl.[7] .................. H01M 8/04; H01M 8/06
(52) U.S. Cl. .................. 429/19; 429/22; 429/23; 429/24
(58) Field of Search .................. 429/17, 19, 20, 429/22, 23, 24

(56) References Cited
U.S. PATENT DOCUMENTS 4,002,805 A * 1/1977 Waldman ............... 429/17
6,306,531 B1 * 10/2001 Clingerman et al. ........ 429/19
6,485,854 B1 * 11/2002 Grover et al. .............. 429/17

FOREIGN PATENT DOCUMENTS

| JP | 4-296457 | * 10/1992 | ............ H01M/8/04 |
| JP | 8-306379 | 11/1996 | ............ H01M/8/06 |

* cited by examiner

*Primary Examiner*—Stephen Kalafut
(74) *Attorney, Agent, or Firm*—Foley & Lardner (57) ABSTRACT

A reformer (2) produces a reformate gas by partial oxidation of vaporized fuel with air supplied through a first air supply passage (10A). A hydrogen-rich gas is produced by removing carbon monoxide from the reformate gas with a carbon monoxide oxidizer (3) and thereafter is supplied to the fuel cell stack (1). A second air supply passage (8A) which has a smaller cross sectional area than the first air supply passage (10A) is also provided to supply air to the reformer (2). When substantially no load is applied to the fuel cell stack (1), the first air supply passage (10A) is cut off with a valve (7A) and a minute amount of air is supplied to the reformer (2) from the second air supply passage (8A) to maintain a standby operation of the power plant in order to prevent reductions in the temperature of the fuel cell stack (1).

9 Claims, 7 Drawing Sheets

T, T1, T2, T3 TEMPERATURE SENSOR

FUEL CELL POWER PLANT

FIELD OF THE INVENTION

This invention relates to standby operation of a fuel cell power plant which generates electric power using a reformate gas.

BACKGROUND OF THE INVENTION

Tokkai Hei 8-306379 published by the Japanese Patent Office in 1996 discloses standby operation of a fuel cell power plant which generates power in a fuel cell stack using a reformate gas.

According to this prior art, when power supply by the fuel cell power plant is not required, the fuel cell power plant is operated to achieve an output of 25–30% of a rated output. This output is used to electrolyze water in order to produce hydrogen. The resulting hydrogen is re-supplied to the fuel cell stack.

Due to this low-output standby operation, when power supply is required, rated operation of the fuel cell power plant can be rapidly established. Furthermore, since hydrogen produced during the standby operation is re-supplied to the fuel cell stack, consumption of reformate gas during standby operation can be maintained at low levels.

SUMMARY OF THE INVENTION

When electrolyzing water, supply of water must be ensured. When the fuel cell power plant is mounted in a vehicle, a water supply device has also to be installed in the vehicle. However, it is difficult to ensure a space for the water supply device with a water tank in the vehicle.

As a result, in a vehicle-mounted fuel cell power plant, it is preferred that water is not electrolyzed and low-output standby operation with only the aim of maintaining the temperature of the fuel cell stack is performed.

In a fuel cell power plant using a reformer to generate a reformate gas by partial oxidation, the temperature of the reformate gas is controlled by the amount of air supplied to the reformer. During standby operation in order to maintain the temperature of the fuel cell stack, the amount of air supplied to the reformer is conspicuously lower than during rated operation. The air supply amount is generally controlled using a valve. However problems arise in maintaining control accuracy of the valve throughout the wide range from the minute flow amounts above to the high flow amounts during rated operation.

It is therefore an object of this invention to realize standby operation adapted to a fuel cell power plant mounted in a vehicle.

In order to achieve the above object, this invention provides a fuel cell power plant comprising a fuel cell stack generating power using a hydrogen-rich gas, a hydrogen-rich gas generating mechanism which produces a hydrogen-rich gas by an exoergic reaction of a vaporized fuel and air, a first air supply passage which supplies air to the hydrogen-rich gas generating mechanism, a second air supply passage which supplies air to the hydrogen-rich gas generating mechanism, and a cut off valve which cuts off the first air supply passage. The second air supply passage is set to have a smaller cross sectional area than the first air supply passage.

The details as well as other features and advantages of this invention are set forth in the remainder of the specification and are shown in the accompanying drawings.

DESCRIPTION OF THE PREFERRED EMBODIMENTS

Figure 1:
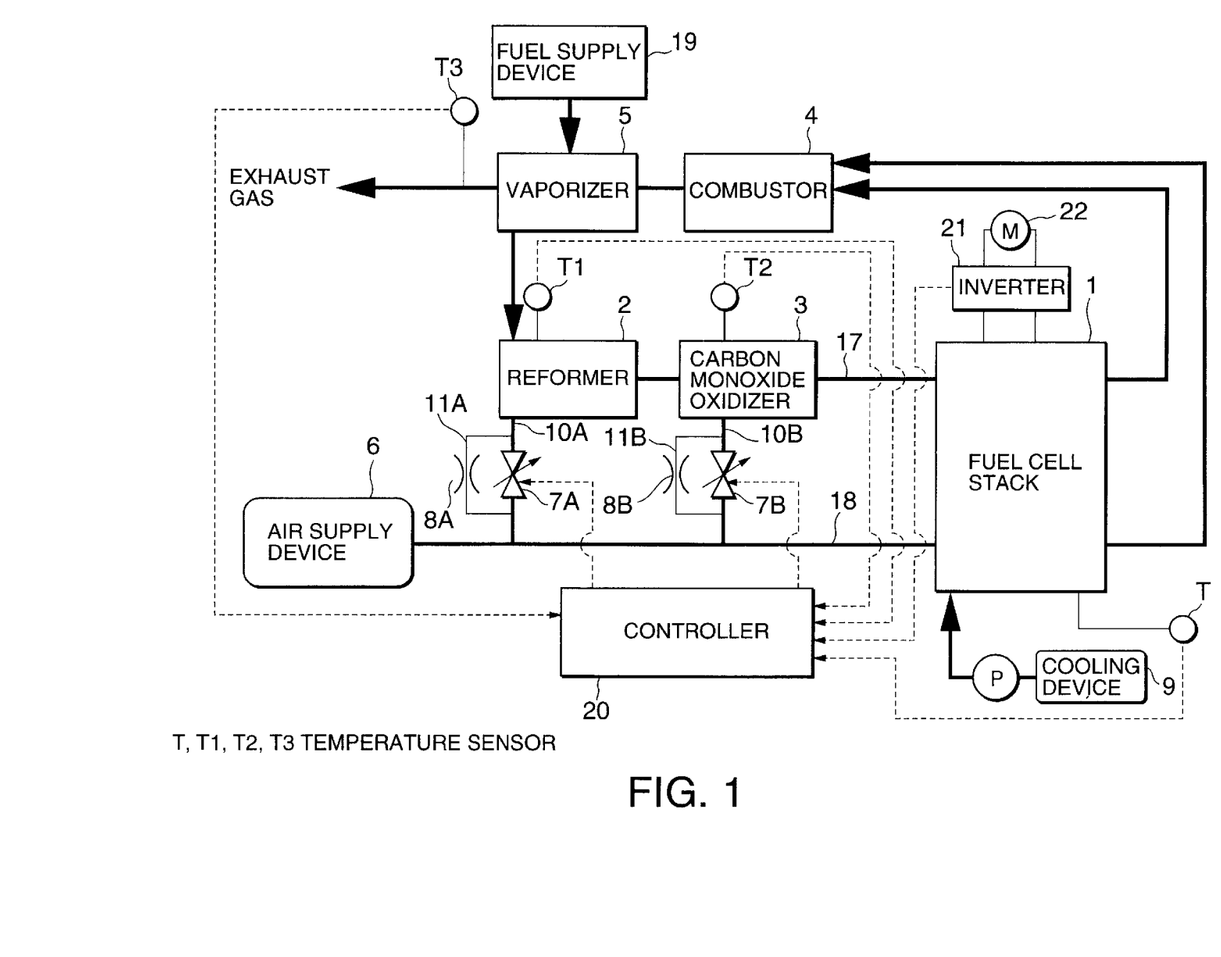
FIG. 1 is a schematic diagram of a fuel cell power plant for a vehicle according to this invention.

Referring to FIG. 1 of the drawings, a fuel cell power plant for a vehicle comprises a fuel cell stack 1, a reformer 2, a carbon monoxide oxidizer 3, a catalytic combustor 4, a vaporizer 5, an air supply device 6 and a cooling device 9.

The fuel cell stack 1 comprises laminated polymer electrolyte fuel cells (PEFC). Each cell is provided with an anode and a cathode and power is generated using a hydrogen-rich gas applied to the anode and air applied to the cathode. The fuel cell stack 1 drives an electric motor 22 for running the vehicle through an inverter 21 with the generated power. A hydrogen-containing anode effluent produced by the anode and an oxygen-containing cathode effluent produced by the cathode are respectively discharged during power generation.

The reformer 2 produces a reformate gas as a result of partial oxidation reactions using a vaporized fuel supplied from the vaporizer 5 and air supplied from the air supply device 6 through an air supply passage 10A.

The carbon monoxide oxidizer 3 performs preferential oxidation of the reformate gas using air supplied through the air supply passage 10B from the air supply device 6. A hydrogen-rich gas is generated by using these reactions to remove carbon monoxide from the reformate gas. The resulting hydrogen-rich gas is supplied to the anode of the fuel cell stack 1 through a passage 17. Deterioration of a platinum catalyst used in the anode as a result of poisoning by carbon monoxide is prevented by the carbon monoxide oxidizer 3 removing carbon monoxide from the reformate gas.

The air supply device 6 comprises a blower or a compressor. The air supply device 6 supplies air to the cathode in the fuel cell stack 1 through a passage 18.

Hydrogen-containing anode effluent and oxygen-containing cathode effluent from the cathode are respectively supplied to the combustor 4. The combustor 4 performs catalytic combustion of the hydrogen-containing anode effluent with the oxygen-containing cathode effluent and supplies the heat of reaction to the vaporizer 5 in the form of a combustion gas. The vaporizer 5 vaporizes a liquid fuel such as gasoline or methanol supplied from a fuel supply device 19 with the heat of combustion in order to produce a fuel vapor. The fuel supply device 19 is provided with a fuel tank, a fuel pump and a valve.

A cooling device 9 uses a cooling medium in order to prevent the temperature of the fuel cell stack 1 from exceeding a predetermined temperature.

A flow amount control valve 7A and a bypass passage 12A are provided in parallel in the air supply passage 10A. A flow amount control valve 7B and a bypass passage 11B are provided in parallel in the air supply passage 10B.

The bypass passage 11A is provided with an orifice 8A and the bypass passage 11B is provided with an orifice 8B.

The opening of the flow amount control valves 7A and 7B is controlled by signals from a controller 20. For this control, a temperature sensor T1 is provided to detect a temperature t of the reformer 2. The detected temperature from the temperature sensor T1 is input into the controller 20. A signal from an inverter 21 which detects the load on the fuel cell stack 2 is also input into the controller 20.

The controller 20 comprises a microcomputer or plural microcomputers each of which is provided with a central processing unit (CPU), a read only memory (ROM), a random access memory (RAM) and an input/output interface (I/O interface).

Figure 2:
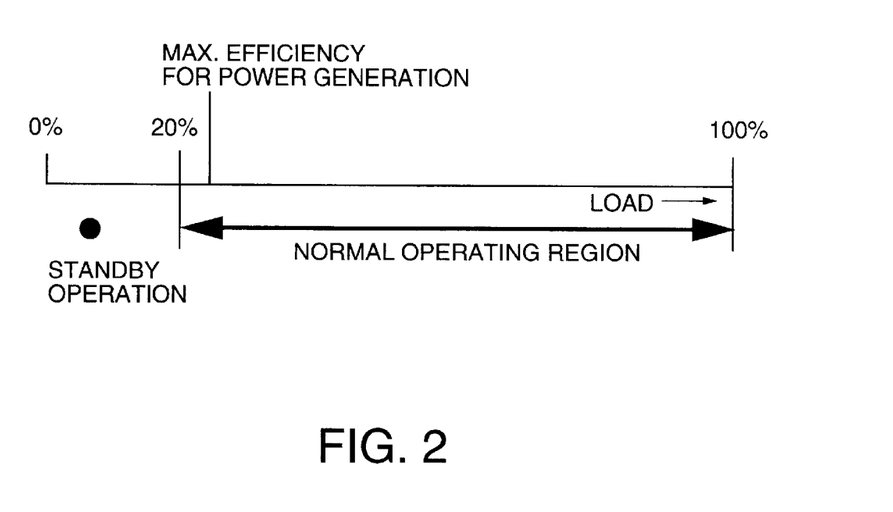
FIG. 2 is a diagram of the load regions of the fuel cell power plant.

FIG. 2 shows a load applied to the fuel cell stack 1 during operation. The load region when the electric motor 22 is driven is shown by the arrow. This region contains a value of 100% which corresponds to rated output conditions and the point of maximum efficiency for power generation. Load in the range of 20% to 100% corresponds to this region. This region is referred to as the normal operating region in the description hereafter.

Even when the load on the fuel cell stack 1 is substantially equal to zero, it is preferred to maintain the temperature of the fuel cell stack 1 to greater than or equal to 60° C. in order to maintain response characteristics for increasing the output of the fuel cell stack 1 in response to increases in load.

As a result, when the temperature of the fuel cell stack 1 decreases, small amounts of high-temperature reformate gas are supplied to the fuel cell stack 1 from the reformer 2 by performing standby operation of the fuel cell power plant when load is in the vicinity of 0%. Herein operation of the fuel cell power plant comprises supplying a hydrogen-rich gas from the reformer 2 and the carbon monoxide oxidizer 3 to the fuel cell stack 1 by operating the fuel supply device 19 and the air supply device 6.

Although operation of the electric motor 22 is stopped during standby operation, a fall in the temperature of the fuel cell stack 1 is prevented by supplying a high-temperature hydrogen-rich gas to the fuel cell stack 1. This is due to the fact that the fuel supply device 19 supplies small amounts of fuel to the vaporizer 5 and the air supply device 6 supplies a small amount of air to the reformer 2 and the carbon monoxide oxidizer 3.

In order to maintain the fuel cell stack 1 at greater than or equal to 60° C., it is necessary to perform standby operation in order to maintain the temperature t of the reformer 2 at greater than or equal to a lower limiting temperature t2. In this embodiment, the lower limiting temperature t2 is set to 400° C.

On the other hand, excessive increases in the temperature of the reformer 2 due to standby operation result in deterioration of the catalyst in the reformer 2. For this reason, standby operation is stopped and the temperature t of the reformer 2 is limited to less than or equal to an upper limiting temperature t1 in order to prevent catalyst deterioration. In this embodiment, the upper limiting temperature t1 is set to 800° C.

When the temperature of the reformer 2 is 800° C. during standby operation, the temperature of the fuel cell stack 1 is 80° C. Stopping standby operation means that the operation of the fuel pump 21 and the air supply device 6 is stopped.

The load region in which standby operation is occasionally performed in response to the temperature of the reformer 2 is hereinafter referred to as the standby operation region.

In the standby operation region, the temperature of the fuel cell stack 1 is maintained in a range of 60° C. to 80° C. by maintaining the temperature of the reformer 2 to a temperature range of 400° C. to 800° C.

Figure 4:
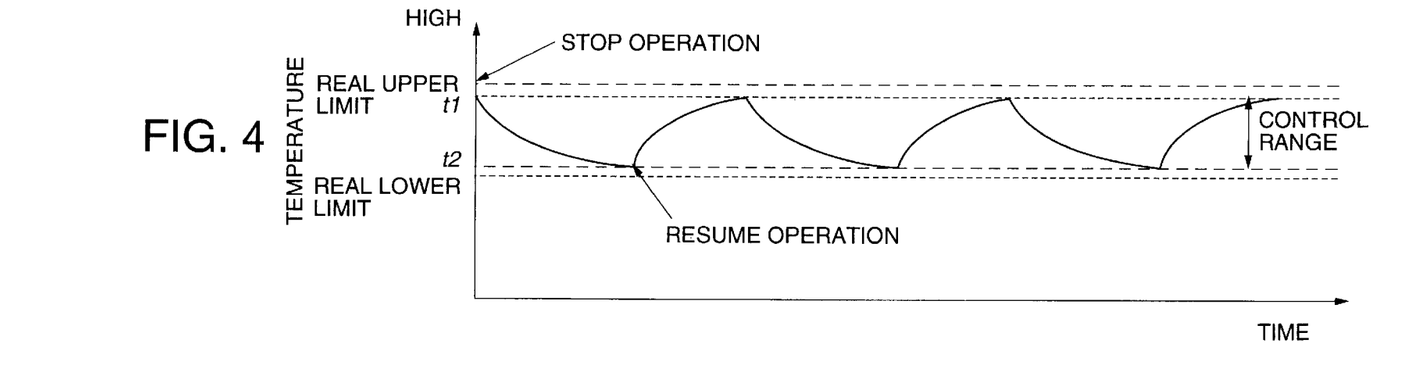
FIG. 4 is a timing chart describing temperature variation in a reformer during standby operation of the fuel cell power plant.

During actual control as shown in FIG. 4, the upper limiting temperature t1 of the reformer 2 is practically set to a slightly lower temperature than the real upper limiting temperature which actually results in catalyst deterioration.

Similarly, the lower limiting temperature t2 is set to a slightly higher temperature than the real lower limiting temperature required to maintain the fuel cell stack 1 at 60° C.

Figure 3:
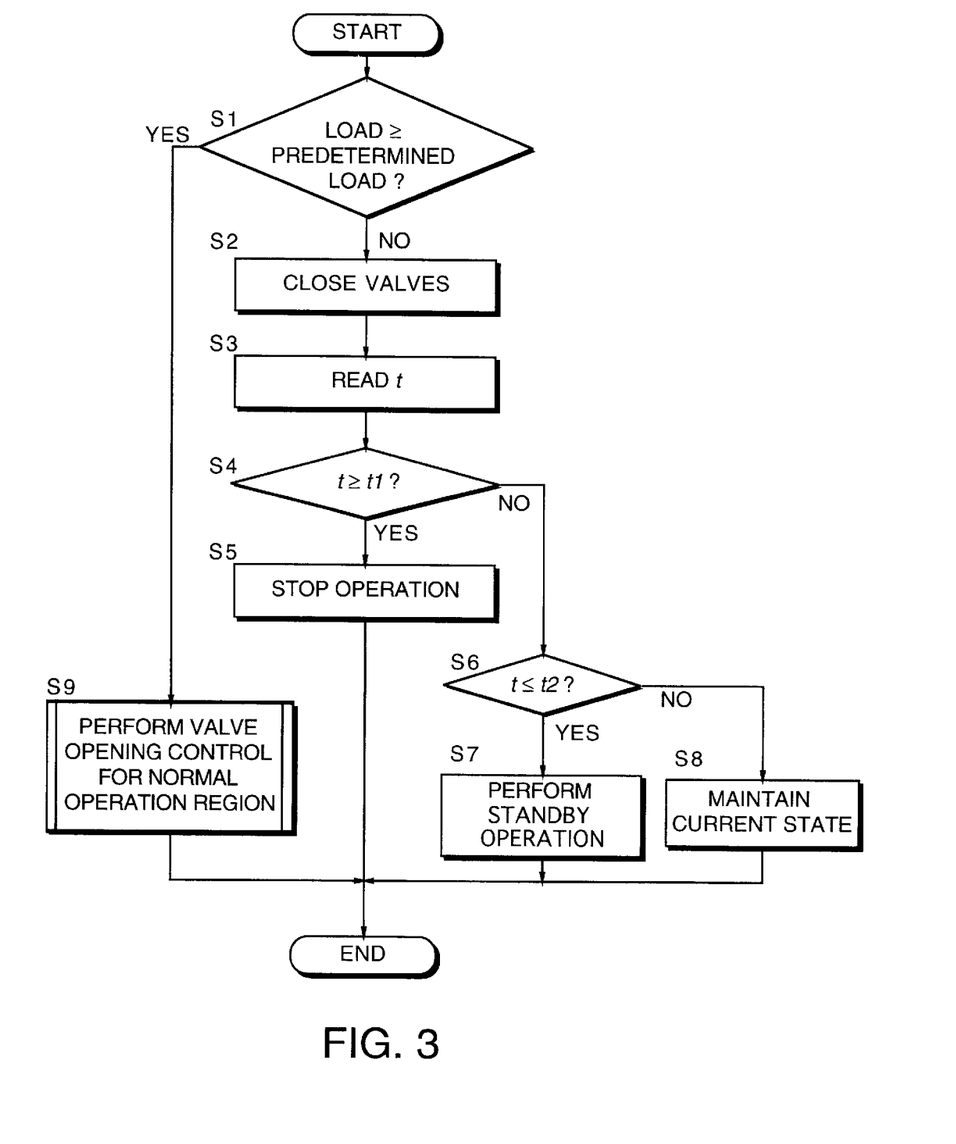
FIG. 3 is a flowchart of a temperature control routine of the fuel cell power plant performed by a controller according to this invention.

The controller 20 executes a temperature control routine as shown in FIG. 3 at intervals of ten milliseconds in response to the load applied to the fuel cell stack 1 in order to realize the above temperature condition in the fuel cell power plant.

Referring now to FIG. 3, in a step S1, the controller 20 determines whether or not the load on the fuel cell stack 1 is greater than or equal to a predetermined load based on the signal from the inverter 21. The predetermined load is a value allowing discrimination of the normal operation region from the standby operation region and is set to a value between 20% representing the lower limit of the normal operation region and 0% representing the standby operation region.

Description of the flowchart will be simplified by dividing the operation regions of the fuel cell stack 1 into the normal operation region and the standby operation region. Thus in the step S1, the fuel cell stack 1 is in the normal operation region when the load is greater than or equal to the predetermined load and is in the standby operation region when the load is less than the predetermined load.

When the fuel cell stack 1 is determined to be in the normal operation region in the step S1, the controller 20 controls the flow amount control valves 7A and 7B and the fuel pump 19 in response to the load in a step S9 and the routine is terminated. This control is performed by a subroutine, but description of control in the normal operation region is omitted as it is not directly related to this invention.

When the fuel cell stack 1 is determined to be in the standby operation region in the step S1, the controller 20 closes the flow amount control valves 7A and 7B in a step S2. As a result, the supply of air to the reformer 2 and the carbon monoxide oxidizer 3 is only allowed via the orifice 8A and 8B. Then in a step S3, the controller 20 reads the temperature t of the reformer 2 detected by the temperature sensor T1.

In a step S4, it is determined whether or not the temperature t of the reformer 2 is greater than or equal to the upper limiting temperature t1. When the temperature t of the reformer 2 is greater than or equal to the upper limiting temperature t1, the controller 20 stops the operation of the fuel cell power plant in a step S5 and the routine is terminated.

Stopping the operation of the fuel cell power plant means that the supply device 6 are stopped. It is possible to continue operation of the air supply device 6 and only stop operation of the fuel pump.

Stopping the operation of the fuel cell power plant does not mean that the execution of the routine of the controller 20 is stopped. Even when the operation of the fuel cell power plant is stopped, the controller 20 continues the execution of the temperature control routine.

When the temperature t of the reformate gas is lower than the upper limiting temperature t1 in the step S4, the controller 20 determines whether or not the temperature t of the reformate gas is less than or equal to the lower limiting temperature t2 in a step S6.

When the temperature t of the reformer 2 is less than or equal to the lower limiting temperature t2, standby operation of the fuel cell power plant is performed in a step S7. When standby operation of the fuel cell power plant is already being performed, continuation of that standby operation is provided for by the process in the step S7. After completing the process in the step S7, the controller 20 terminates the routine.

In the step S6, when temperature t of the reformer 2 is greater than or equal to the lower limiting temperature t2, the present operation state of the fuel cell power plant continues unchanged in a step S8 and the routine is terminated. Continuation of the present state means that standby operation is continued when the fuel cell power plant is operating in standby operation and when the operation of the fuel cell power plant is currently not performed, the operation continues to be stopped.

As a result of this control in the standby operation region, a pattern is repeated of stopping the operation of the fuel cell power plant when the temperature t of the reformer 2 increases to the upper limiting temperature t1 and starting standby operation thereof when the temperature of the reformer 2 decreases to the lower limiting temperature t2. Therefore it is possible to maintain the temperature of the fuel cell stack 1 to a preferred temperature region during standby conditions as discussed above.

During standby operation, the amount of air supplied to the reformer 2 and the carbon monoxide oxidizer 3 from the air supply device 6 is conspicuously lower than during normal operation.

This fuel cell power plant is provided with orifices 8A and 8B having small cross-sectional area for standby operation which are disposed in parallel to the flow amount control valves 7A and 7B which control the air flow amount during normal operation. The controller 20 completely closes the air flow control valves 7A and 7B in the standby operation region. As a result, in the standby operation region, air is only supplied to the reformer 2 and the carbon monoxide oxidizer 3 through the orifices 8A and 8B. That is to say, in the standby operation region, control of the air flow amount is not performed by the controller 20 and a predetermined small amount of air required for standby operation is supplied to the reformer 2 and the carbon monoxide oxidizer 3 in a stable manner through the orifices 8A and 8B.

In this manner, air flow amount control is performed by the flow amount control valves 7A and 7B only in the normal operation region. As a result, it is possible to reduce the cost of the flow amount control valves 7A and 7B by limiting their control range to a flow amount greater than a fixed amount. Since control of the air flow amount is not performed during standby operation as shown by the temperature control routine in FIG. 3, the routine is also simplified.

In this embodiment, temperature control is performed in the standby operational region based on the temperature t of the reformer 2 detected by the temperature sensor T1. However instead of the temperature sensor T1, temperature control may be performed based on the temperature of another part which displays a correlation with the temperature of the fuel cell stack 1 or the reformer 2.

For example, it is possible to use a temperature sensor T which detects the temperature of the fuel cell stack 1, a temperature sensor T2 which detects the temperature of the hydrogen-rich gas of the carbon monoxide oxidizer 3 or a temperature sensor T3 detecting the temperature of the fuel vapor from the vaporizer 5.

Figure 5:
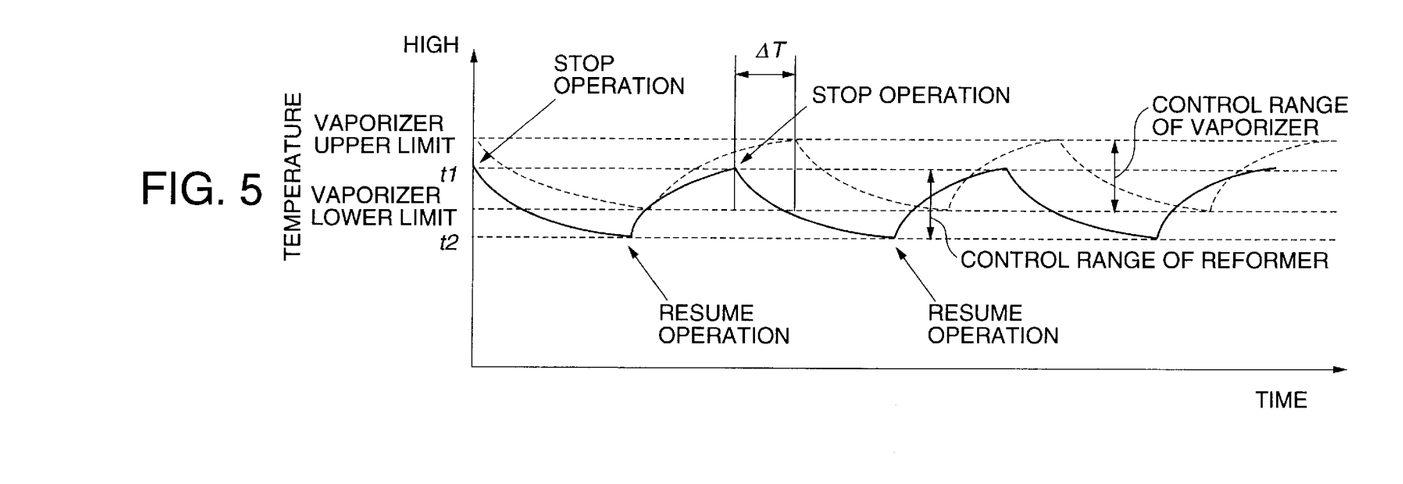
FIG. 5 is similar to FIG. 4, but showing a different situation.

Referring to FIG. 5, the temperature of the fuel vapor from the vaporizer 5 reacts with a time lag $\Delta T$ with respect to the temperature t of the reformer 2. Since combustion gas is supplied from the combustor 4 to the vaporizer 5, the upper limiting value and lower limiting value of the temperature of the fuel vapor of the vaporizer 5 is increased in comparison to the upper limiting value t1 and the lower limiting value t2 of the reformer 2. When temperature control is performed in the standby operational region based on the temperature detected by the temperature sensor T, the temperature sensor T2 or the temperature sensor T3, it is necessary to take into consideration the difference in the upper and lower limiting values in view of the correlation between the temperature t of the reformer 2 and the detected temperature.

In this embodiment, although the orifices 8A and 8B are provided in the bypass passages 11A and 11B, a choke having a small cross-sectional area may be provided in the bypass passage 11A and 11B instead of an orifice.

Figure 6A:
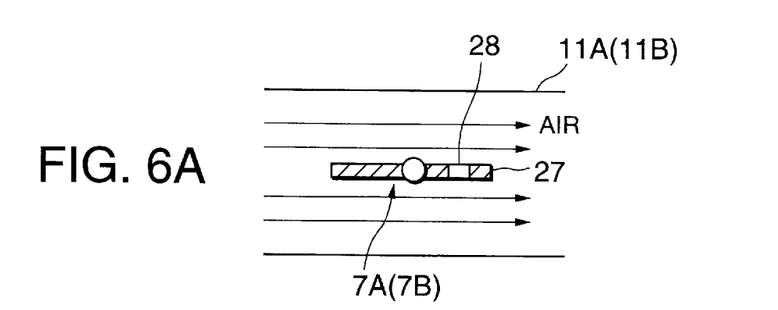
FIGS. 6A and 6B are longitudinal sectional views of a flow amount control valve according to this invention.
Figure 6B:
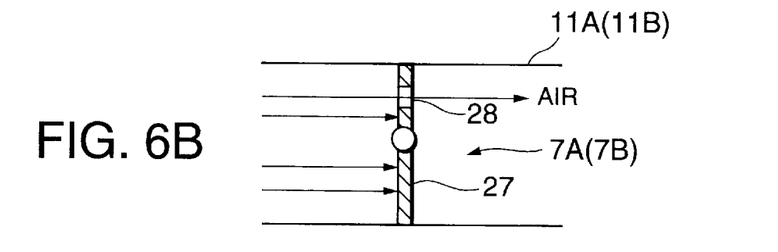

Furthermore a through hole 28 of a small cross-sectional area may be provided in the valve body 27 of the flow amount control valve 7A(7B) as shown in FIGS 6A and 6B instead of providing the bypass passage 11A and 11B.

In this embodiment, although a bypass passage is provided for both the air supply passage 10B to the carbon monoxide oxidizer 3 and the air supply passage 10A to the reformer 2, a considerable effect may be obtained by providing a bypass passage for either one of the air supply passages 10A and 10B.

Figure 7:
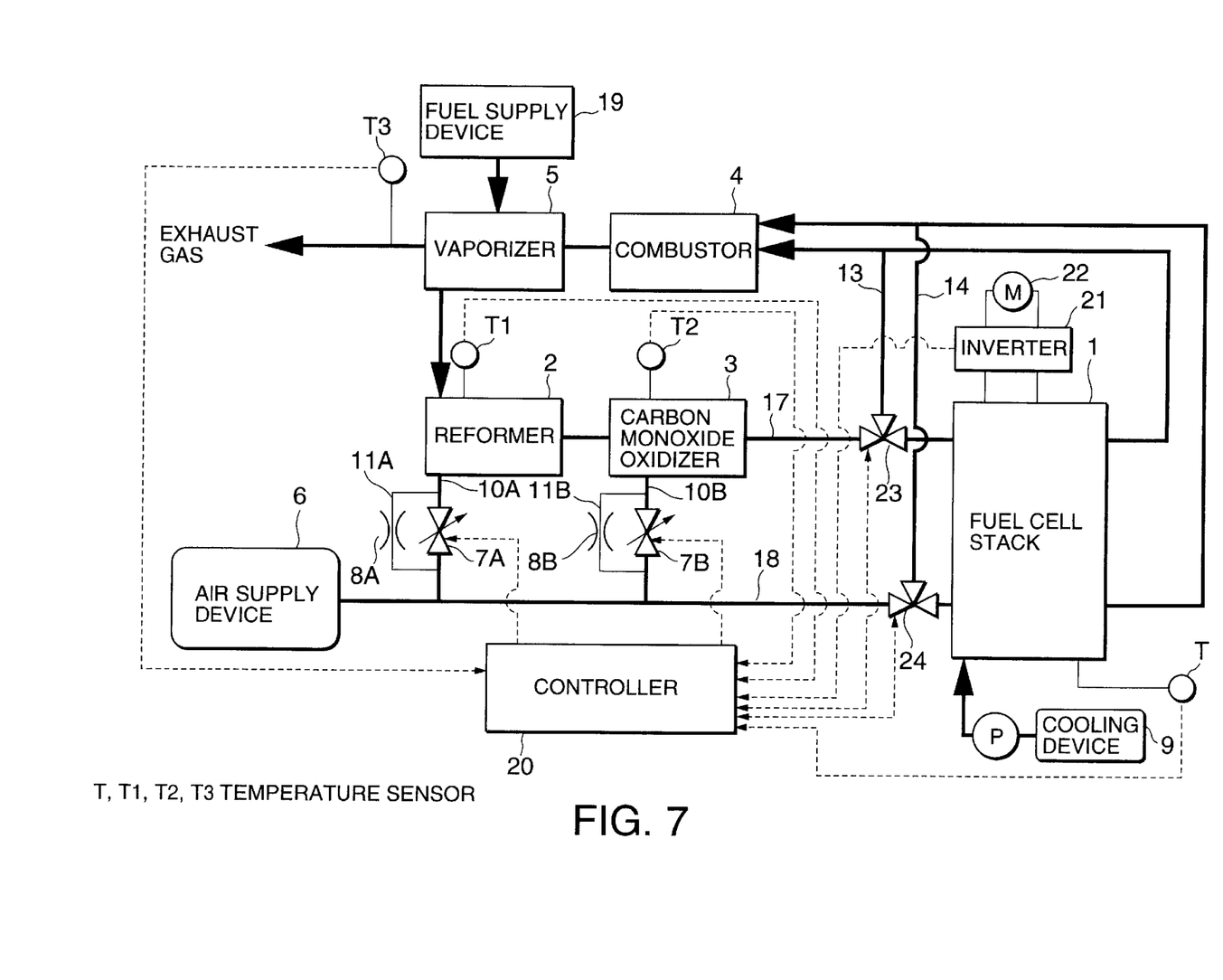
FIG. 7 is a schematic diagram of a fuel cell power plant for a vehicle according to a second embodiment of this invention.

A second embodiment of this invention will now be described with reference to FIG. 7.

In this embodiment, a directly-connecting passage (hereafter referred to as a direct passage) 13 is provided for directly connecting the passage 17 to the combustor 4 through a switching valve 23 while bypassing the fuel cell stack 1.

Another direct passage 14 is provided for directly connecting the combustor 4 and the passage 18 through a switching valve 24 while bypassing the fuel cell stack 1. Other features of the fuel cell power plant are the same as those described with reference to the first embodiment.

According to this embodiment, in the normal operation region, the controller 20 generates power with the fuel cell stack 1 in the same manner as the first embodiment by connecting the passage 17 to the fuel cell stack 1 with an operation of the switching valve 23 and connecting the passage 18 to the fuel cell stack 1 with an operation of the switching valve 24.

In the standby operation region, the controller 20 connects the passage 17 to the direct passage 13 with an operation of the switching valve 23 and connects the passage 18 to the direct passage 14 with an operation of the switching valve 24. As a result, air and hydrogen-rich gas are directly supplied to the combustor 4 while bypassing the fuel cell stack 1. Since air and hydrogen-rich gas are not supplied to the fuel cell stack 1 during standby operation, the fuel cell stack 1 does not generate any power at all and the whole amount of hydrogen-rich gas and air is combusted in the combustor 4. Thus it is possible to reduce the fuel consumption used to maintain the temperature of the fuel cell stack 1.

During standby operation, gas flowing from the passage 17 to the fuel cell stack 1 is cut off by the switching valve 23. Thus during standby operation, even when the concentration of carbon monoxide in the gas in the passage 17 is high, the platinum catalyst on the anode of the fuel cell stack 1 does not suffer poisoning by the carbon monoxide. Therefore, the bypass passage 11B and the orifice 8B may be omitted so as to stop the supply of air to the carbon monoxide oxidizer 3 in the standby operation region.

Figure 8:
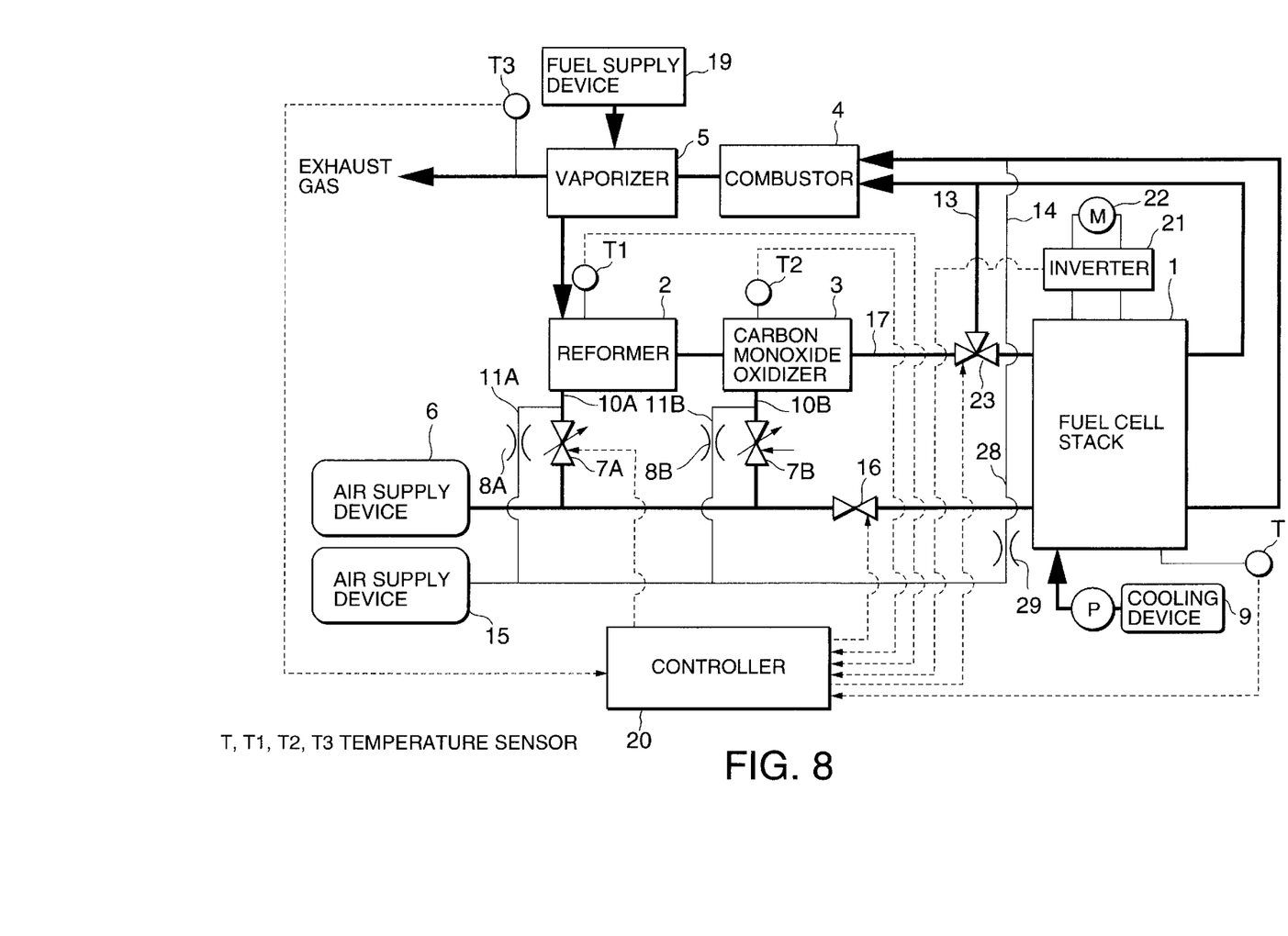
FIG. 8 is a schematic diagram of a fuel cell power plant for a vehicle according to a third embodiment of this invention.

A third embodiment of this invention will be described with reference to FIG. 8.

In this embodiment, a small-amount air supply device 15 is provided separately from the air supply device 6 and the bypass passages 11A and 11B are connected to the small-amount air supply device 15. Furthermore a passage 28 which connects the small-amount air supply device 15 to the combustor 4 is provided instead of the direct passage 14 and the switching valve 24 in the second embodiment. An orifice 29 is provided in the passage 28. A cut off valve 16 is provided in the passage 18 which supplies air to the fuel cell stack 1 from the air supply device 6. In other respects, this embodiment is the same as the second embodiment.

In the normal operation region, the controller 20 supplies air to the reformer 2 and the carbon monoxide oxidizer 3 through the flow control valve 7A and 7B from the air supply device 6 in the same manner as the first and second embodiments. On the other hand, in the standby operation region, the small-amount air supply device 15 is operated and respectively small amounts of air are supplied to the reformer 2 through the orifice 8A, to the carbon monoxide oxidizer 3 through the orifice 8B and to the combustor 4 through the orifice 29. The operation of the air supply device 6 is stopped and the flow amount control valves 7A and 7B and the cut off valve 16 are closed.

The air supply device 6 is designed to have an air supply capacity amount which is required for rated output operation of the fuel cell stack 1. When the air supply device 6 is adapted to small-amount air supply during standby operation, energy efficiency is reduced.

In this embodiment, it is possible to prevent reductions in energy efficiency related to supply of air by providing a small-amount air supply device 15.

The contents of Tokugan 2000-368485, with a filing date of Dec. 4, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A fuel cell power plant comprising:
   a fuel cell stack generating power using a hydrogen-rich gas;
   a hydrogen-rich gas generating mechanism which produces a hydrogen-rich gas by an exoergic reaction of a vaporized fuel and air;
   a first air supply passage which supplies air to the hydrogen-rich gas generating mechanism;
   a second air supply passage which supplies air to the hydrogen-rich gas generating mechanism, the second air supply passage having a smaller cross sectional area than the first air supply passage; and
   a cut off valve which cuts off the first air supply passage.

2. The fuel cell power plant as defined in claim 1, wherein the power plant further comprises a vaporized fuel supply mechanism which supplies a vaporized fuel to the hydrogen-rich generating mechanism, a sensor which detects a load on the fuel cell stack, a sensor which detects a temperature of a predetermined position in the fuel cell power plant, and a controller functioning to:
   determine whether or not the load is less than or equal to a predetermined load;
   close the valve when the load is less than or equal to the predetermined load;
   compare the temperature when the valve is closed with a predetermined temperature range;
   control the vaporized fuel supply mechanism to stop supplying of vaporized fuel to the hydrogen-rich gas generating mechanism when the temperature is higher than the predetermined temperature range; and
   control the vaporized fuel supply mechanism to perform supplying of vaporized fuel to the hydrogen-rich generating mechanism when the temperature is lower than the predetermined temperature range.

3. The fuel cell power plant as defined in claim 2, wherein the fuel cell stack is connected to an electric motor and the predetermined load is set to be smaller than a minimum load on the fuel cell stack when the electric motor is operated.

4. The fuel cell power plant as defined in claim 2, wherein the hydrogen-rich gas generating mechanism comprises a reformer which produces a reformate gas using air and vaporized fuel and a carbon monoxide oxidizer which produces the hydrogen-rich gas by removing carbon monoxide from the reformate gas, and the predetermined position corresponds to any of the reformer, the carbon monoxide oxidizer, the fuel cell stack and the vaporized fuel supply mechanism.

5. The fuel cell power plant as defined in claim 2, wherein the fuel cell power plant further comprises a combustor which combusts a hydrogen-containing anode effluent discharged from the fuel cell stack, and the vaporized fuel supply mechanism comprises a vaporizer which vaporizes liquid fuel using heat generated by a combustion of the hydrogen-containing anode effluent in the combustor.

6. The fuel cell power plant as defined in claim 1, wherein the second air supply passage comprises an orifice which bypasses the valve.

7. The fuel cell power plant as defined in claim 1, wherein the valve comprises a valve body which cuts off the first air supply passage, and the second air supply passage comprises a through hole formed in the valve body.

8. The fuel cell power plant as defined in claim 1, wherein the fuel cell power plant further comprises a second valve which cuts off supply of the hydrogen-rich gas to the fuel cell stack from the hydrogen-rich gas generating mechanism.

9. The fuel cell power plant as defined in claim 1, wherein the fuel cell power plant further comprises a first air supply device which supplies air to the first air supply passage, and a second air supply device which supplies air to the second air supply passage, the second air supply device having a smaller capacity than the first air supply device.

* * * * *